(12) United States Patent
Wang et al.

(10) Patent No.: US 12,112,402 B2
(45) Date of Patent: Oct. 8, 2024

(54) METHOD, ELECTRONIC DEVICE, AND COMPUTER PROGRAM PRODUCT FOR PROCESSING TARGET OBJECT

(71) Applicant: Dell Products L.P., Round Rock, TX (US)

(72) Inventors: Zijia Wang, WeiFang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 17/969,782

(22) Filed: Oct. 20, 2022

(65) Prior Publication Data

US 2024/0095970 A1 Mar. 21, 2024

(30) Foreign Application Priority Data

Sep. 16, 2022 (CN) .......................... 202211132120.8

(51) Int. Cl.
*G06F 40/20* (2020.01)
*G06T 1/00* (2006.01)
(Continued)

(52) U.S. Cl.
CPC .............. *G06T 11/00* (2013.01); *G06F 40/20* (2020.01); *G06T 1/0021* (2013.01); *G10L 15/02* (2013.01); *G10L 25/06* (2013.01); *G10L 25/57* (2013.01)

(58) Field of Classification Search
CPC ........ G06F 40/30; G06F 40/20; G06F 18/214; G06F 16/783; G06F 40/40; G06T 13/40; G06T 11/60; G06T 11/00; G10L 15/02
See application file for complete search history.

(56) References Cited

U.S. PATENT DOCUMENTS

2010/0266157 A1* 10/2010 Shin ..................... H04N 19/467
382/100
2021/0248801 A1* 8/2021 Li .......................... G06T 13/205
(Continued)

OTHER PUBLICATIONS

G. Gafni et al., "Dynamic Neural Radiance Fields for Monocular 4D Facial Avatar Reconstruction," arXiv:2012.03065v1, Dec. 5, 2020, 11 pages.

(Continued)

*Primary Examiner* — Hau H Nguyen
(74) *Attorney, Agent, or Firm* — Ryan, Mason & Lewis, LLP

(57) ABSTRACT

Embodiments of the present disclosure relate to a method, an electronic device, and a computer program product for processing a target object. The method includes acquiring an initial non-video feature vector on the basis of at least one input of a received speech input and text input. The method further includes taking, in response to not receiving a video input, a default feature vector as an initial video feature vector corresponding to the video input. The method further includes generating a video feature, a speech feature, and a text feature on the basis of the initial non-video feature vector and the initial video feature vector. The method further includes generating a processing parameter for a target object on the basis of the video feature, the speech feature, and the text feature, wherein the processing parameter includes at least one of an emotion parameter, an attribute parameter, and a pose parameter.

20 Claims, 7 Drawing Sheets

(51) Int. Cl.
*G06T 11/00* (2006.01)
*G10L 15/02* (2006.01)
*G10L 25/06* (2013.01)
*G10L 25/57* (2013.01)

(56) References Cited

U.S. PATENT DOCUMENTS

2022/0092276 A1* 3/2022 Tu .......................... G06F 40/30
2022/0101629 A1* 3/2022 Liu ......................... G06F 16/75

OTHER PUBLICATIONS

J. Liu et al., "OPT: Omni-Perception Pre-Trainer for Cross-Modal Understanding and Generation," arXiv:2107.00249v2, Jul. 6, 2021, 10 pages.
T.-H. Oh et al., "Speech2Face: Learning the Face Behind a Voice," arXiv:1905.09773v1, May 23, 2019, 11 pages.
G. Gafni et al., "Dynamic Neural Radiance Fields for Monocular 4D Facial Avatar Reconstruction," IEEE/CVF Conference on Computer Vision and Pattern Recognition, Jun. 2021, pp. 8649-8658.

* cited by examiner

100

User 105

METHOD, ELECTRONIC DEVICE, AND COMPUTER PROGRAM PRODUCT FOR PROCESSING TARGET OBJECT

RELATED APPLICATION

The present application claims priority to Chinese Patent Application No. 202211132120.8, filed Sep. 16, 2022, and entitled "Method, Electronic Device, and Computer Program Product for Processing Target Object," which is incorporated by reference herein in its entirety.

FIELD

Embodiments of the present disclosure relate to the field of computers, and more specifically, to a method, an electronic device, and a computer program product for processing a target object.

BACKGROUND

With the continuous development of computer vision technology, in application scenarios such as remote conferences and entertainment, processing, such as rendering and driving, a target object (such as a face) in an image has gradually become a focus of attention. Users can interact with a target object in a video on the basis of current relevant technologies such as face detection, face driving, face reconstruction, and rendering.

SUMMARY

Embodiments of the present disclosure provide a method, an electronic device, and a computer program product for processing a target object.

According to a first aspect of the present disclosure, a method for processing a target object is provided. The method includes acquiring an initial non-video feature vector on the basis of at least one input of a received speech input and text input. The method further includes taking, in response to not receiving a video input, a default feature vector as an initial video feature vector corresponding to the video input. The method further includes generating a video feature, a speech feature, and a text feature on the basis of the initial non-video feature vector and the initial video feature vector. The method further includes generating a processing parameter for a target object on the basis of the video feature, the speech feature, and the text feature, wherein the processing parameter includes at least one of an emotion parameter, an attribute parameter, and a pose parameter.

According to a second aspect of the present disclosure, an electronic device is provided. The electronic device includes at least one processor; and a memory coupled to the at least one processor and having instructions stored thereon, wherein the instructions, when executed by the at least one processor, cause the electronic device to perform actions including: acquiring an initial non-video feature vector on the basis of at least one input of a received speech input and text input; taking, in response to not receiving a video input, a default feature vector as an initial video feature vector corresponding to the video input; generating a video feature, a speech feature, and a text feature on the basis of the initial non-video feature vector and the initial video feature vector; and generating a processing parameter for a target object on the basis of the video feature, the speech feature, and the text feature, wherein the processing parameter includes at least one of an emotion parameter, an attribute parameter, and a pose parameter.

According to a third aspect of the present disclosure, a computer program product is provided, which is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Figure 1:
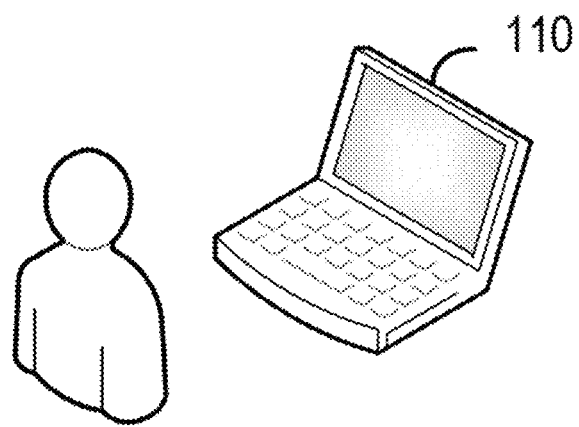
FIG. 1 illustrates a schematic diagram of an example environment in which a device and/or a method according to embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, users can interact with a target object, such as a face, in a video on the basis of current relevant technologies such as face detection, face driving, face reconstruction, and rendering. In order to improve the interaction effect and obtain more ideal processing results that meet expectations of users (for example, facial expressions and postures are more in line with the expectations), parameters for rendering and driving a face can be acquired through inputs of various modalities, such as a video input (for example, a video clip), a speech input (for example, an audio clip), and a text input (for example, a piece of text content).

However, in practical applications, it is often difficult to obtain inputs of all the three modalities, i.e., the speech input, the text input, and the video input at the same time. Especially the video input is more difficult to generate than the speech input and the text input. Moreover, requirements for hardware configurations for generating a video are also higher, thereby increasing the cost in devices, and the generated video also takes up a larger storage space. In addition, in the process of generating a processing parameter for a target object, inputs are often random. Usually, not all the three modalities exist. For example, it may be only the speech input, only the text input, or only both the speech input and the text input. Therefore, how to flexibly utilize two or even one of the three modalities to generate ideal processing results for the target object (for example, facial expressions and poses that are more in line with expectations) is desired.

In order to at least solve the above and other potential problems, an embodiment of the present disclosure provides a method for processing a target object. The method includes acquiring an initial non-video feature vector on the basis of at least one input of a received speech input and text input. The method further includes taking, in response to not receiving a video input, a default feature vector as an initial video feature vector corresponding to the video input. The method further includes generating a video feature, a speech feature, and a text feature on the basis of the initial non-video feature vector and the initial video feature vector. The method further includes generating a processing parameter for a target object on the basis of the video feature, the speech feature, and the text feature, wherein the processing parameter includes at least one of an emotion parameter, an attribute parameter, and a pose parameter. The method for processing the target object according to this embodiment of the present disclosure can flexibly adapt to inputs of various modalities, and effectively utilize the correlation between inputs of the modalities, so that the correlation between inputs of the modalities can be fully used in the process of generating the processing parameter, and the generated processing parameter is more accurate. Further, the method for processing the target object according to this embodiment of the present disclosure can also acquire a driving video feature used for representing the video input even when there is no video input at that moment, so that the processing parameter that is more accurate than that in the related art can be generated with flexible adaptation to inputs of various modalities, and the processing of the target object is more in line with an expectation. For example, it is conducive to rendering the target object to be more real to further improve the experience of a user. In addition, the user does not need to purchase or configure an expensive video generating hardware device, so that the use cost for the user is also reduced.

Embodiments of the present disclosure will be further described in detail below in conjunction with the accompanying drawings. FIG. 1 illustrates an application scenario diagram comprising an example system 100 for implementing a method for processing a target object according to some embodiments of the present disclosure. As shown in FIG. 1, user 105 operates electronic device 110, illustratively a local electronic device relative to user 105, to process a target object in an image to be processed. For example, user 105 outputs a piece of speech so that the target object (for example, face) in the image to be processed can present various dynamic expressions and poses, thus obtaining a generated video. In the generated video, the target object can present dynamic expressions, poses, etc. Furthermore, in the processed video, the target object can also be rendered into a three-dimensional virtual target object (for example, a three-dimensional virtual image) through various rendering technologies, and the converted virtual target object can also present dynamic expressions, poses, etc., so as to provide the user with richer visual effects and further enhance the user experience.

The generated video can also be sent to a remote terminal device such as an intelligent terminal via a network, so as to interact with a user of the remote terminal device and improve the experience of the local user and the remote user. A video sharing scenario is taken as an example. User 105 can further process (such as add various special effects, filters, and the like) the video generated by electronic device 110, and send the further processed video to the user of the remote terminal device such as a remote intelligent terminal, thus achieving sharing of information, which further improves the experience of the user.

Although electronic device 110 is shown as a portable computer in FIG. 1, it should be understood that electronic device 110 may be an electronic device in any other form. The present disclosure does not limit the type of the electronic device that implements the method for processing a target object according to embodiments of the present disclosure. For example, the electronic device may include, but is not limited to, a personal computer, a server computer, a handheld or laptop device, a mobile device (such as a mobile phone, a personal digital assistant (PDA), and a media player), a multi-processor system, a consumer electronic product, a wearable electronic device, an intelligent home device, a minicomputer, a mainframe computer, an edge computing device, a distributed computing environment including any of the above systems or devices, etc. In addition, FIG. 1 may include any number and any type of electronic devices and any form of communication network, which is not limited in the present disclosure. Although the above description is illustrated by taking video sharing as an example, it should be understood that the method for processing a target object according to the present disclosure can be applied to any other suitable application scenarios, which is not limited in the present disclosure.

Although an example application scenario of the method for processing a target object according to an embodiment of the present disclosure is described above with reference to FIG. 1, those skilled in the art can understand that the method for processing a target object according to an embodiment of the present disclosure may not be limited to the above scenario, and can also be applied to any suitable scenarios as required. The present disclosure does not limit the application scenarios. The method for processing the target object according to this embodiment of the present disclosure can flexibly adapt to inputs of various modalities, and effectively utilize the correlation between inputs of the modalities, so that the correlation between inputs of the modalities can be fully used in the process of generating the processing parameter, and the generated processing parameter is more accurate. Further, the method for processing the target object according to this embodiment of the present disclosure can also acquire a driving video feature used for representing the video input even when there is no video input at that moment, so that the processing parameter that is more accurate than that in the related art can be generated with flexible adaptation to inputs of various modalities, and the processing of the target object is more in line with an expectation. For example, it is conducive to rendering the target object to be more real to further improve the experience of a user. In addition, the user does not need to purchase or configure an expensive video generating hardware device, so that the use cost for the user is also reduced.

Figure 2:
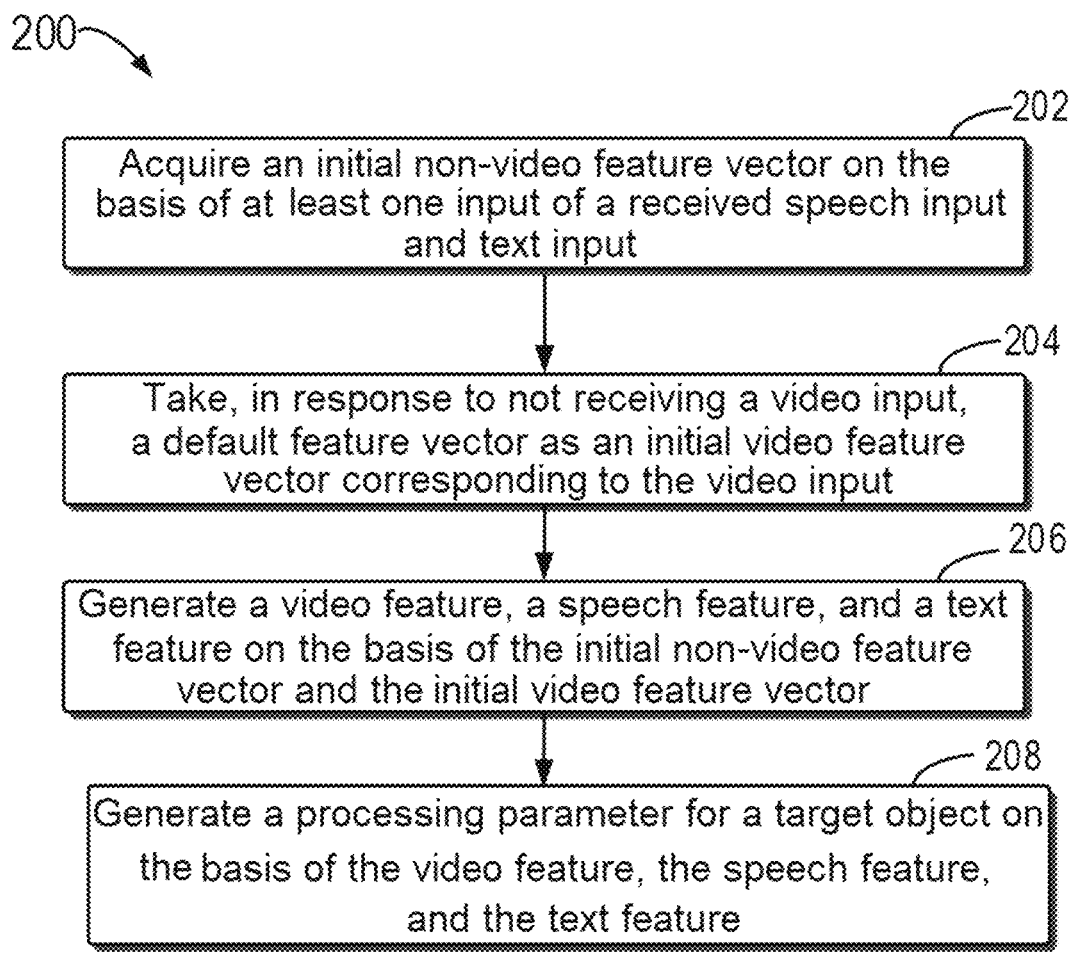
FIG. 2 illustrates a flow chart of a method for processing a target image according to an embodiment of the present disclosure.

A block diagram of example system 100 in which embodiments of the present disclosure can be implemented has been described above with reference to FIG. 1. A flow chart of method 200 for processing a target object according to an embodiment of the present disclosure will be described below with reference to FIG. 2. Method 200 can be implemented at electronic device 110 of user 105 in FIG. 1 and any suitable electronic device.

At block 202, electronic device 110 acquires an initial non-video feature vector on the basis of at least one input of a received speech input and text input. Electronic device 110 may receive at least one input of the speech input and the text input. In one embodiment, the speech input may include a pre-recorded or real-time audio clip. The audio clip may include audio in which user 105 is the speaker, and may also include audio of any other speakers other than user 105. The audio clip may also include audio input acquired after performing a text-to-speech operation on the received text input (a speech recognition technology existing in the art or to be developed in the future may be used), and this embodiment of the present disclosure does not limit the content, format, etc. of the speech input. In one embodiment, the text input may include a text with a textual content. For example, the text input may include a piece of text entered by user 105 through an input device (such as a keyboard) of electronic device 110. In addition, the text input may also include a corresponding text input obtained after performing speech recognition on the received audio clip (a speech recognition technology existing in the art or to be developed in the future may be used). The present disclosure does not limit the language, format, etc. of the characters.

Electronic device 110 may acquire an initial non-video feature vector on the basis of the received at least one input. In one embodiment, the initial non-video feature vector includes at least one of an initial speech feature vector and an initial text feature vector corresponding to the at least one input. The specific process of acquiring the initial non-video feature vector will be described below with reference to the accompanying drawings.

At block 204, electronic device 110 takes, in response to not receiving a video input, a default feature vector as an initial video feature vector corresponding to the video input. In one embodiment, the default feature vector may include an all-zero vector. In one embodiment, in response to not receiving any video input within a predetermined time period (such as 60 seconds, which may be set as required), electronic device 110 may acquire the default feature vector, for example, the all-zero vector, as the initial video feature vector. That is, electronic device 110 may not need to receive a video input, but may set the all-zero vector as the initial video feature vector. Therefore, in the method for processing the target object according to embodiments of the present disclosure, without receiving the video input, an accurate processing parameter can also be acquired to render the target object, and a desired output result can also be achieved.

At block 206, electronic device 110 may generate a video feature, a speech feature, and a text feature on the basis of the initial non-video feature vector and the initial video feature vector. In one embodiment, electronic device 110 generates, on the basis of the initial non-video feature vector and the initial video feature vector, the video feature, the speech feature, and the text feature for the target object in the image to be processed, and the video feature, the speech feature, and the text feature all include a correlation between input information received by electronic device 110, which will be further described below in combination with FIG. 4.

At block 208, electronic device 110 generates a processing parameter for the target object on the basis of the video feature, the speech feature, and the text feature, wherein the processing parameter includes at least one of an emotion parameter, an attribute parameter, and a pose parameter.

In one embodiment, electronic device 110 may input the generated video feature, speech feature, and text feature into a multimodal encoder to generate the processing parameter for the target object by the multimodal encoder. In one embodiment, the processing parameter includes at least one of the expression parameter, the attribute parameter, and the pose parameter. In some embodiments, the attribute parameter represents inherent attributes of the target object, such as the face shape and positions of the five sense organs; the expression parameter may represent various expressions of the target object, such as smiling, squinting, and opening the mouth; and the pose parameter may represent poses of the target object, such as bowing the head and turning the head, which are not limited in the present disclosure. Furthermore, in one embodiment, the target object may include a face, such as a human face and a face of a cartoon character.

The method for processing the target object based on this embodiment of the present disclosure can flexibly adapt to inputs of various modalities, and effectively utilize the correlation between inputs of the modalities, so that the correlation between inputs of the modalities can be fully used in the process of generating the processing parameter, and the generated processing parameter is more accurate. Further, the method for processing the target object according to this embodiment of the present disclosure can also acquire a driving video feature used for representing the video input even when there is no video input at that moment, so that the processing parameter that is more accurate than that in the related art can be generated with flexible adaptation to inputs of various modalities, and the processing of the target object is more in line with an expectation. For example, it is conducive to rendering the target object to be more real to further improve the experience of a user. In addition, the user does not need to purchase or configure an expensive video generating hardware device, so that the use cost for the user is reduced.

Figure 3:
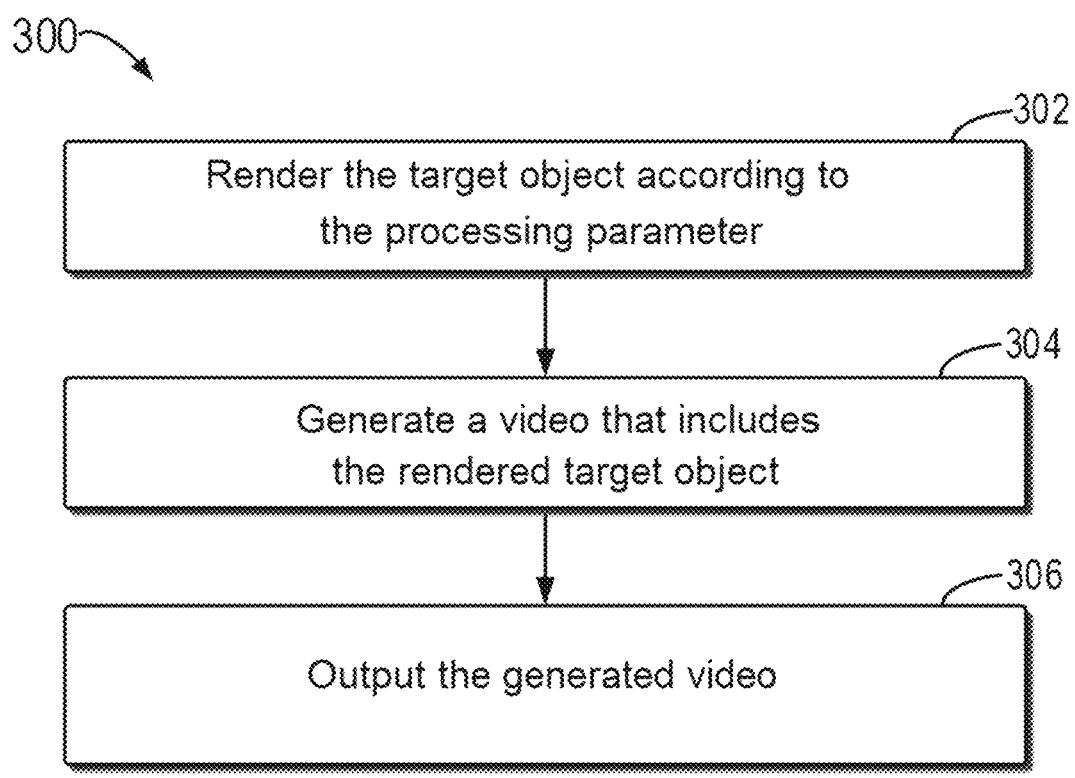
FIG. 3 illustrates a flow chart of a method for further processing the target object according to an embodiment of the present disclosure.

FIG. 3 illustrates a flow chart of a method 300 for further processing the target object according to an embodiment of the present disclosure. Method 300 can be implemented at electronic device 110 of user 105 in FIG. 1 and any suitable electronic device.

At block 302, electronic device 110 may render the target object according to the processing parameter. In one embodiment, electronic device 110 may render the target object in the image to be processed on the basis of at least one of the acquired expression parameter, attribute parameter, and pose parameter, so as to generate a rendered target object. The target object is a face, for example, in the image to be processed, such as a human face, the face of a cartoon character, or faces in various other styles. Electronic device 110 may perform operations such as superimposing the acquired expression parameter, attribute parameter, and pose parameter with the target object, and perform rendering (for example, using an existing rendering technology or a rendering technology to be developed in the future).

At block 304, electronic device 110 generates a video including the rendered target object. By means of implementing the method for processing a target object according to embodiments of the present disclosure, a group of expression parameter, attribute parameter, and pose parameter that represent dynamic effects are acquired. Correspondingly, the rendered target object has dynamic expressions and poses. In one embodiment, electronic device 110 may render the target object to be a 2D form, and the rendered target object may have corresponding dynamic expressions, poses, and the like according to the processing parameter. In one embodiment, electronic device 110 may also render the target object to be a 3D form, and the rendered target object may have corresponding dynamic expressions, poses, and the like according to the processing parameter. Therefore, a richer visual experience is provided for the user. Electronic device 110 may synthesize all the frames of image of the rendered target object together to generate a video, and the target object (human face or virtual character) in the generated video has dynamic expressions, poses, and the like.

At block 306, electronic device 110 outputs the generated video. For example, electronic device 110 may show the generated video to user 105 through a display screen of the electronic device. In addition, electronic device 110 may also send the generated video to a remote terminal device such as an intelligent terminal through a network, so as to interact with the user of the remote terminal device.

In some embodiments, when the target object is the target object in the image to be processed, in order to ensure the data security, the method according to embodiments of the present disclosure may further add a watermark to the image to be processed that includes the target object. For example, the electronic device may generate random noise (for example, on the basis of various existing technologies such as a generative adversarial network, and technologies to be developed in the future) and add the generated random noise to the image to be processed to add a watermark to the image to be processed. Correspondingly, the video generated according to method 300 will also include the corresponding watermark, so that the data security of the user can be protected in various application scenarios.

Process 400 of generating the video feature, the speech feature, and the text feature of the target object in the image to be processed during the image processing according to an embodiment of the present disclosure will be described below with reference to FIG. 4. It can be understood that the process in FIG. 4 is only illustrative.

Figure 4:
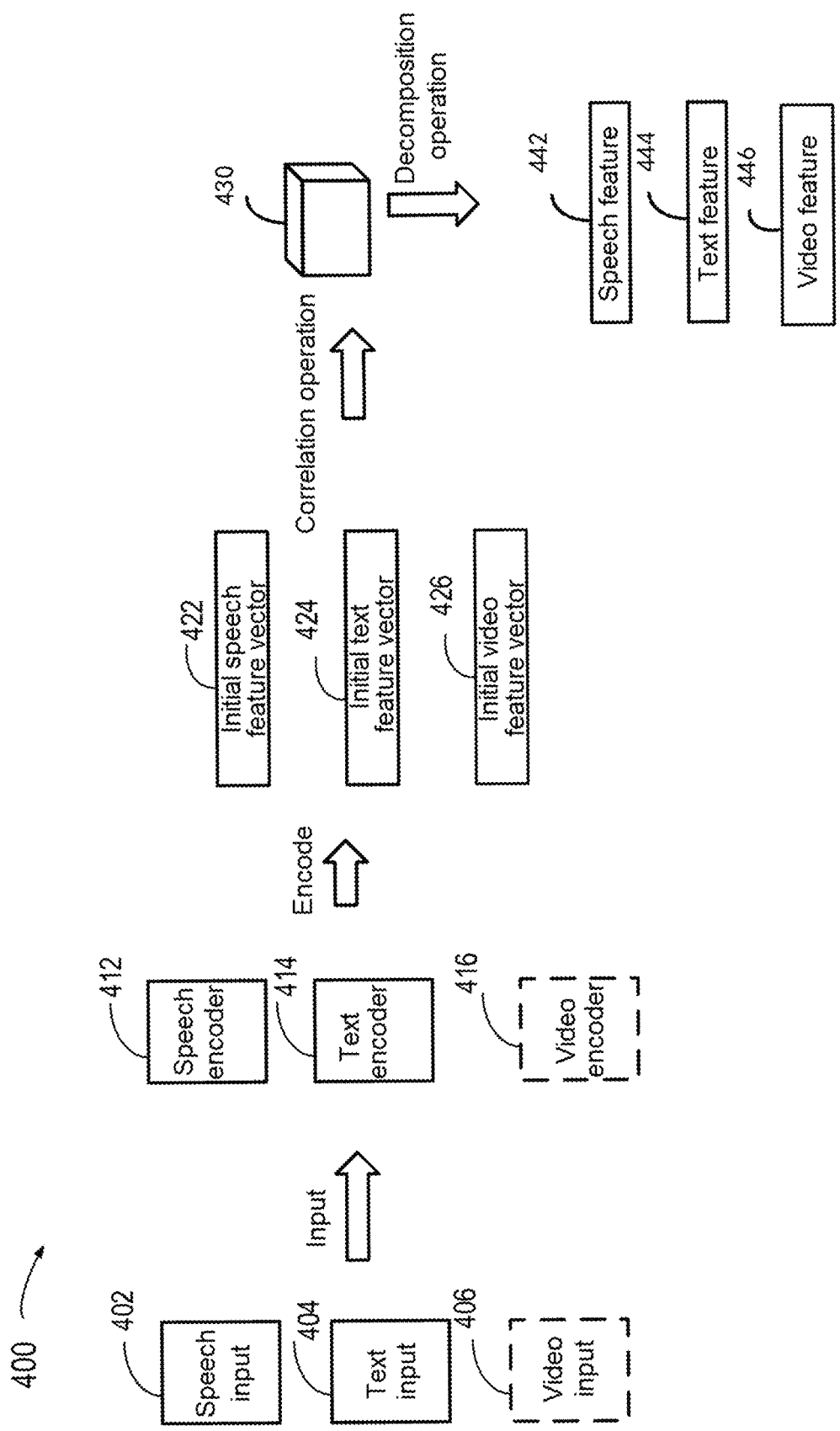
FIG. 4 illustrates a schematic diagram of a process of generating a video feature, a speech feature, and a text feature for the target object.

FIG. 4 illustrates a schematic diagram of process 400 of generating the video feature, the speech feature, and the text feature for the target object in the image to be processed. In one embodiment, electronic device 110 may receive speech input 402 and/or text input 404. Electronic device 110 may input the received input information to a corresponding encoder to extract a corresponding feature vector. For example, when electronic device 110 receives speech input 402 (for example, one or more audio clips), electronic device 110 may input received speech input 402 to speech encoder 412, for example, a wave2vec 2.0 encoder. Speech encoder 412 encodes the speech input to obtain initial speech feature vector 422. Similarly, when electronic device 110 receives text input 404, electronic device 110 may input the received text input 404 to text encoder 414, for example, a BERT encoder, where BERT denotes Bidirectional Encoder Representations from Transformers. The text encoder 414 encodes text input 404 to obtain initial text feature vector 424. Similarly, when electronic device 110 receives text input 404 and speech input 402, electronic device 110 may input received text input 404 and speech input 402 to text encoder 414 and speech encoder 412, respectively, for example, the BERT encoder and the wave2vec 2.0 encoder. Text encoder 414 and speech encoder 412 respectively encode text input 404 and speech input 402 to respectively obtain initial text feature vector 424 and initial speech feature vector 422.

In one embodiment, received speech input 402 and/or text input 404 may also be translated by a translator before received speech input 402 and/or text input 404 are respectively input to text encoder 414 and speech encoder 412, so as to obtain a speech input and/or a text input of a target language, so that features of the translated speech input and/or text input of the target language are extracted to further improve the user experience.

As mentioned above, in response to not receiving any video input within a predetermined time period (such as 60 seconds, which may be set as required), electronic device 110 may acquire the all-zero vector as initial video feature vector 426. That is, electronic device 110 can set the all-zero vector as the initial video feature vector without receiving a video input and encoding the video input, so that the method for processing a target object according to embodiments of the present disclosure can also achieve an accurate processing parameter rendering the target object without receiving the video input (therefore, a box corresponding to video input 406 in FIG. 4 is represented by dotted lines), thus achieving a desired output result.

In addition, in one embodiment, as described in FIG. 4, electronic device 110 may receive video input 406. Video input 406 may include one or more video clips. The electronic device may input video input 406 to video encoder 416, such as a fast R-CNN encoder, where R-CNN denotes Region-based Convolutional Neural Network. Video encoder 416 encodes video input 406 to obtain initial video feature vector 426.

In addition, although in FIG. 4, the boxes corresponding to speech input 402 and text input 404 are indicated by solid lines, this is only illustrative. It can be understood that electronic device 110 may only receive one of speech input 402 and text input 404. Correspondingly, electronic device 110 may set the initial feature vector corresponding to the other one of speech input 402 and text input 404 than the received input to be the all-zero vector. For example, in response to only receiving speech input 402, electronic device 110 may set initial text feature vector 424 corresponding to text input 404 to be the all-zero vector. Similarly, in response to only receiving text input 404, electronic device 110 may set initial speech feature vector 422 corresponding to speech input 402 to be the all-zero vector. Thus, the method for processing a target object according to embodiments of the present disclosure can flexibly adapt to inputs of various types of modalities.

Continuing to refer to FIG. 4, the initial feature vectors may include initial speech feature vector 422, initial text feature vector 424, and initial video feature vector 426. In the inputs of three types of modalities (speech, video, and text), the initial feature vector corresponding to the received input is the initial feature vector extracted after the input is applied to the corresponding encoder. In one embodiment, the initial feature vectors corresponding to the unreceived modality inputs may be set to be the all-zero vectors. The specific implementation can be understood with reference to the exemplary description above, and details are not repeated here.

The following description assumes that electronic device 110 receives speech input 402 and text input 404, but does not receive video input 406 as an example. Correspondingly, initial speech feature vector 422 is a feature vector obtained after speech encoder 412 encodes speech input 402, which can be expressed as $f_a = \{a_1, a_2, a_3, \ldots, a_n\}$. Initial text feature vector 424 is a feature vector obtained after text encoder 414 encodes text input 404, which can be expressed as $f_t = \{t_1, t_2, t_3, \ldots, t_n\}$. Initial video feature vector 426 may be represented as $f_v = \{0, 0, 0, \ldots, 0\}$. It can be understood that although initial video feature vector $f_v$, initial text feature vector $f_t$, and initial speech feature vector $f_a$ are illustrated in the form of one-dimensional matrices, it can be understood that this is only illustrative. Initial video feature vector $f_v$, initial text feature vector $f_t$, and initial speech feature vector $f_a$ may include feature vectors in the form of multidimensional matrices.

Electronic device 110 may generate indication 430 of a correlation among initial video feature vector 426, initial text feature vector 424, and initial speech feature vector 422 on the basis of obtained initial video feature vector 426, initial text feature vector 424, and initial speech feature vector 422. In one embodiment, indication 430 of the correlation represents a correlation among initial video feature vector 426, initial text feature vector 424, and initial speech feature vector 422.

In some embodiments, during the determination of indication 430 of the correlation, electronic device 110 may perform correlation comparison on an element at a corresponding index in each feature vector of initial video feature vector 426, initial text feature vector 424, and initial speech feature vector 422, and generate, according to the correlation comparison, values at the corresponding indexes of indication 430 of the correlation. For example, if a speech feature element at a certain index represents "cow," a text feature element at the corresponding index also represents "cow," and a video feature element at the corresponding index is "0," it can be determined that the speech feature element at this index is correlated with the text feature element, but the video feature element at this index is not correlated with either the speech feature element or the text feature element. Based on the above determination, electronic device 110 may determine a correlation value of indication 430 of the correlation at this index according to a predetermined correspondence relationship (for example, by looking up a predefined relationship table).

In some embodiments, a correspondence relationship between the correlation of the speech feature element, the text feature element, and the video feature element and the corresponding correlation value may be predefined. For example, if the speech feature element, the text feature element, and the video feature element are all correlated, the corresponding correlation value can be defined to be 9. If the speech feature element, the text feature element, and the video feature element are not correlated with one another, the corresponding correlation value may be defined to be 0. If the speech feature element is correlated with the text feature element, but the video feature element is correlated with neither the speech feature element nor the text feature element, the corresponding correlation value may be defined to be 2. The present disclosure does not limit the specific correlation value.

Indication 430 of the correlation is obtained after the correlation determination is performed on all the feature vector elements in initial video feature vector 426, initial text feature vector 424, and initial speech feature vector 422. Indication 430 of the correlation represents the correlation among the feature elements of each feature vector of initial video feature vector 426, initial text feature vector 424, and initial speech feature vector 422 at the corresponding indexes. The determination of the correlation among elements in each feature vector at the corresponding index may be performed using existing related technologies and technologies to be developed in the future, which is not limited in the present disclosure.

In one implementation, the indication 430 of the correlation may include a synthetic tensor. As shown in FIG. 4, electronic device 110 may perform a decomposition operation on indication 430 comprising the synthetic tensor. In one embodiment, electronic device 110 may perform the decomposition operation on the synthetic tensor to obtain three features: decomposed speech feature 442, decomposed text feature 444, and decomposed video feature 446. It should be understood that any other suitable decomposition technologies may also be used to decompose the tensor to obtain speech feature 442, text feature 444, and video feature 446, which is not limited in the present disclosure.

Speech feature 442, text feature 444, and video feature 446 can be obtained through the above-mentioned decomposition operation. Thus, the initial feature vector input is mapped from an original space to a frequency space. Furthermore, the multidimensional tensor can also be decomposed into a plurality of low-dimensional feature sets, thereby reducing the calculation quantity and improving the operation efficiency. In addition, the decomposed features obtained above are noise-removed features. Correspondingly, the accuracy and effect of the subsequent processing can be further improved.

In one embodiment, electronic device 110 may input speech feature 442, text feature 444, and video feature 446 to a multimodal encoder (not shown in the figure; for example, a transformer-based neural network), to obtain the processing parameter used for processing the target object, such as one or more of the expression parameter, the attribute reference, and the pose parameter. The multimodal encoder can be implemented on the basis of the existing technologies or technologies to be developed in the future, which is not limited in the present disclosure.

Figure 5:
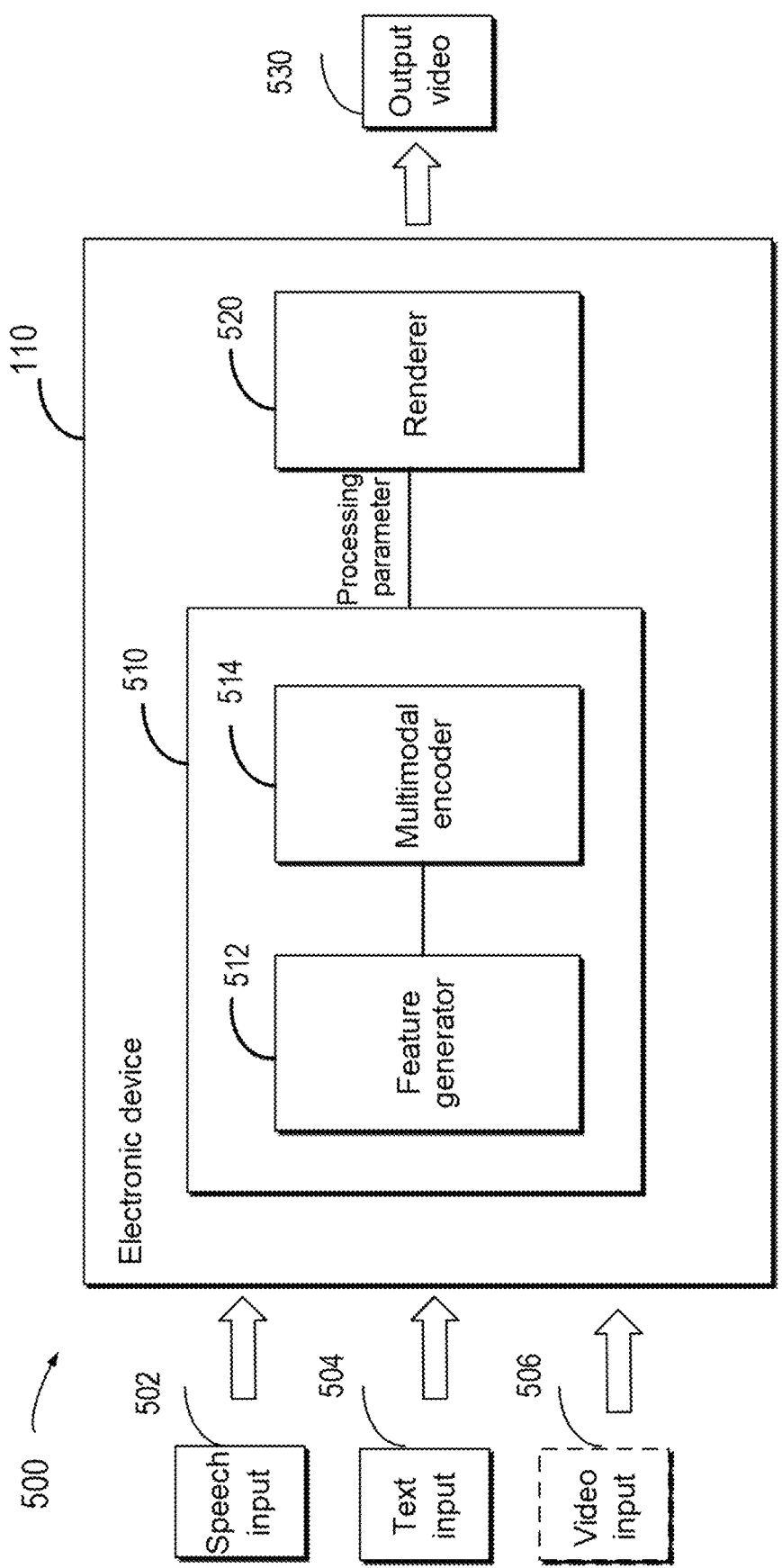
FIG. 5 illustrates a block diagram of a system for implementing the processing method according to an embodiment of the present disclosure.

FIG. 5 illustrates a block diagram of a system 500 for implementing a method for processing a target object according to an embodiment of the present disclosure. Electronic device 110 in system 500 may include an electronic device in any form. For example, the electronic device may include but is not limited to a personal computer, a server computer, a handheld or laptop device, a mobile device (such as a mobile phone, a personal digital assistant (PDA), and a media player), a multi-processor system, a consumer electronic product, a wearable electronic device, an intelligent home device, a minicomputer, a mainframe computer, an edge computing device, a distributed computing environment including any of the above systems or devices, etc.

Electronic device 110 may receive at least one input of speech input 502 and text input 504. In addition, electronic device 110 does not necessarily have to receive video input 506. Therefore, the box of video input 506 in FIG. 5 is shown by dotted lines. Electronic device 110 may include processing parameter generator 510 and a renderer 520. It can be understood that other existing components of the electronic device are not shown for the sake of brevity.

In one embodiment, processing parameter generator 510 includes feature generator 512 and multimodal encoder 514. Specifically, feature generator 512 is configured to receive at least one input of a speech input and a text input, and generate, on the basis of the received at least one input, an initial non-video feature vector. Feature generator 512 takes, in response to not receiving a video input, a default feature vector as an initial video feature vector corresponding to the video input. Feature generator 512 may also generate a video feature, a speech feature, and a text feature for a target object in an image to be processed on the basis of the initial non-video feature vector and the initial video feature vector. The specific implementation of feature generator 512 for generating the video feature, the speech feature, and the text feature may refer to the descriptions in the above combination. For the sake of brevity, the specific implementation will not be repeated here.

In one embodiment, multimodal encoder 514 is configured to receive the video feature, the speech feature, and the text feature from feature generator 512, and generate, on the basis of the received video feature, speech feature, and text feature, a processing parameter. In one embodiment, the processing parameter may include at least one of an expression parameter, an attribute parameter, and a pose parameter. In some implementations, the pose parameter may represent poses of the target object, such as bowing the head and turning the head; the expression parameter may represent expressions of the target object, such as smiling, squinting, and opening the mouth; and the attribute parameter represents inherent attributes of the target object, such as the face shape and positions of the five sense organs, which is not limited in the present disclosure. Multimodal encoder 514 may include a transformer-based neural network used for generating the processing parameter such as the expression parameter, the attribute parameter, and the pose parameter. The present disclosure does not limit the specific structure of multimodal encoder 514.

In one embodiment, renderer 520 may be a renderer implemented on the basis of the existing technologies or technologies to be developed in the future, and is configured to render the target object (for example, a face) in the image to be processed on the basis of the processing parameter of multimodal encoder 514. In one embodiment, renderer 520 may render the target object to be a 2D form, and the rendered target object may have corresponding dynamic expressions, poses, and the like according to the processing parameter, thus generating output video 530. In one embodiment, renderer 520 may also render the target object to be a 3D form, and the rendered target object may have corresponding dynamic expressions, poses, and the like according to the processing parameter. Therefore, output video 530 is formed, which provides a richer visual experience for a user.

Figure 6:
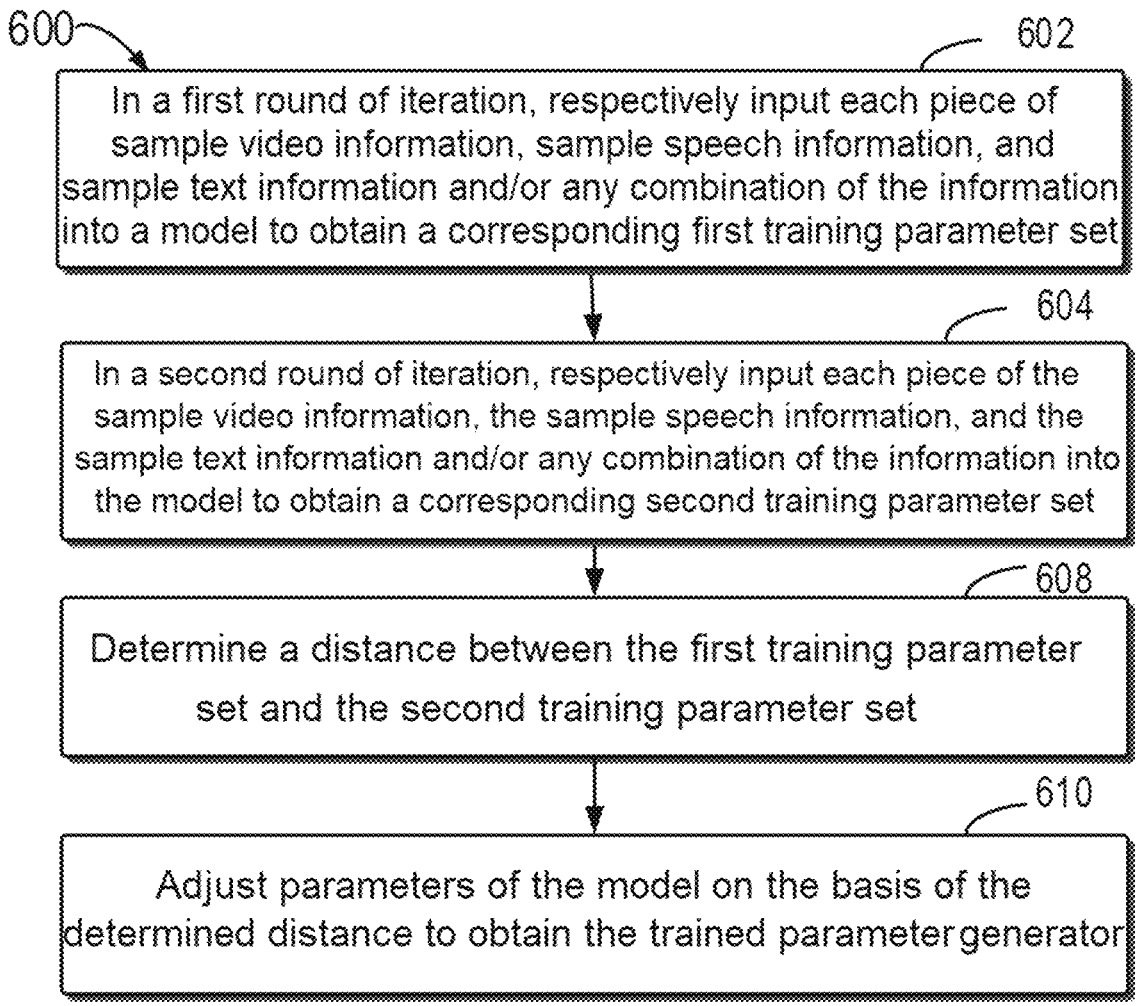
FIG. 6 illustrates a flow chart of a training method for a processing parameter generator.

System 500 for implementing the method for processing a target object according to embodiments of the present disclosure is described above with reference to FIG. 5. In one embodiment, processing parameter generator 510 may be obtained by training. Training method 600 for processing parameter generator 510 may be described with reference to FIG. 6. In one embodiment, the training method may be executed by electronic device 110, or may be executed by other devices different from electronic device 110. The present disclosure does not limit the electronic device that executes training method 600. In the following process of describing training method 600, components performing training method 600 are collectively referred to as a training device. It can be understood that the training device may include electronic device 110 or other electronic devices.

At block 602, in a first round of iteration, the training device respectively inputs each of a sample video input, a sample speech input, and a sample text input and/or any combination of the sample video input, the sample speech input, and the sample text input into a model to obtain a corresponding first training parameter set $P_1$.

In one embodiment, in the first iteration, the training device may respectively input the sample speech input, the sample text input, and the sample video input into the model, thus respectively obtaining corresponding training outputs $P_1=\{P_{a1}, P_{t1}, P_{v1}\}$, where $P_{a1}$ represents a training output processing parameter obtained by inputting only the sample speech input into the model in the first round of iteration. Parameter $P_{a1}$ may include, for example, training output expression parameter $P_{exp}$, training output attribute parameter $P_{int}$, and training output pose parameter $P_{pos}$, that is, $P_{a1}=\{P_{a1exp}, P_{a1int}, P_{a1pos}\}$. Similarly, $P_{t1}$ represents a training output processing parameter obtained by inputting only the sample text into the model in the first iteration. This parameter $P_{t1}$ also includes a group of training output processing parameters, and $P_{t1}$ may be expressed as: $P_{t1}=\{P_{t1exp}, P_{t1int}, P_{t1pos}\}$. Similarly, $P_{v1}$ represents a training output processing parameter obtained by inputting only the sample video into the model in the first iteration. This parameter $P_{v1}$ also includes a group of training output processing parameters, and $P_{v1}$ may be expressed as: $P_{v1}=\{P_{v1exp}, P_{v1int}, P_{v1pos}\}$.

What is described above is an output obtained by inputting only one type of modality into a model for training. It is also possible to input any combination of the sample speech input, the sample text input, and the sample video input into the model to obtain the corresponding training output processing parameters. The present disclosure does not limit the specific combinations.

At block 604, in a second round of iteration, the training device respectively inputs each of the sample video input, the sample speech input, and the sample text input and/or any combination of the sample video input, the sample speech input, and the sample text input into the model to obtain a corresponding second training parameter set $P_2$.

In one embodiment, in the second iteration, the training device may respectively input the sample video input, the sample speech input, and the sample text input into the model, thus respectively obtaining corresponding training outputs $P_2=\{P_{a2}, P_{t2}, P_{v2}\}$, where $P_{a2}$ represents a training output processing parameter, $P_{a2}=\{P_{a2exp}, P_{a2int}, P_{a2pos}\}$, obtained by inputting only the sample speech input into the model in the second round of iteration. Similarly, $P_{t2}$ represents a training output processing parameter obtained by inputting only the sample text into the model in the second iteration. This parameter $P_{t2}$ also includes a group of training output processing parameters, and $P_{t2}$ may be expressed as: $P_{t2}=\{P_{t2exp}, P_{t2int}, P_{t2pos}\}$. Similarly, $P_{v2}$ represents a training output processing parameter obtained by inputting only the sample video into the model in the second iteration. This parameter $P_{v2}$ also includes a group of training output processing parameters, and $P_{v2}$ may be expressed as: $P_{v2}=\{P_{v2exp}, P_{v2int}, P_{v2pos}\}$.

The training device can perform multiple rounds of iterations and obtain the output training processing parameters $P_i$ in the various rounds of iterations. The specific iteration process can be as described at block 602 and block 604, and details are not repeated here.

At block 608, the training device may determine a distance between first training parameter set $P_1$ and second training parameter set $P_2$. In one embodiment, the distance may include a cosine distance. In one embodiment, in a case of multiple rounds of iterations, the training device may determine the distance between training parameter set $P_i$ obtained in the iteration process and training parameter set $P_j$ obtained in another iteration process, and a sum of the distances in the whole iteration process is used as a loss function for training the model, in accordance with Equation (1) below:

$$L = \sum_{i \in \{v,a,t\}} \sum_{j \in \{v,a,t\}, j \neq i} dis(P_i, P_j) \quad (1)$$

In one implementation, when the parameter set includes a plurality of training output parameters (for example, the expression parameter, the attribute parameter, and the pose parameter), correspondingly, during the calculation of the distance, distances are calculated between the corresponding parameters, that is, a distance between the expression parameters, a distance between the attribute parameters, and a distance between the pose parameters are determined. Furthermore, the training device may determine the distance between the parameter sets on the basis of the distances between the various parameters. At block 610, the training device may adjust parameters of the model on the basis of the determined distance to obtain the trained parameter generator.

By means of training the model by "shielding" (for example, not inputting) the input of a certain modality in the training process, the model can be enabled to adapt to the inputs of various types of modalities, and acquire an accurate processing parameter to process the target object, so that the processed target object is more in line with an expectation.

Figure 7:
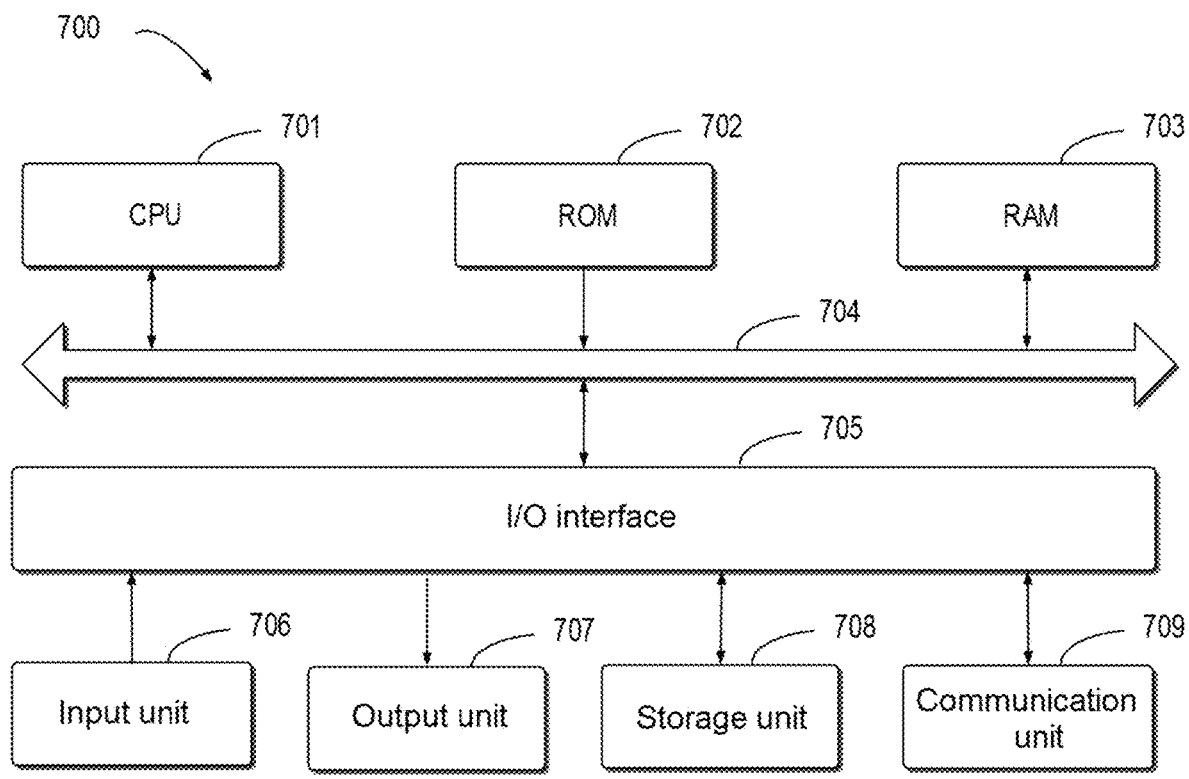
FIG. 7 illustrates an example device suitable for implementing embodiments of the present disclosure according to an embodiment of the present disclosure.

FIG. 7 shows a schematic block diagram of example device 700 that can be used to implement embodiments of the present disclosure. Electronic device 110 in FIG. 1 can be implemented using device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange inputs/data with other devices via a computer network, such as the Internet, and/or various telecommunication networks.

The various processes and processing described above, such as method 200, method 300, and/or method 600, can be executed by CPU 701. For example, in some embodiments, method 200, method 300, method 600, and the like for processing a target object may be implemented as computer software programs which are tangibly contained in a machine-readable medium, such as storage unit 708. In some embodiments, part or all of the computer programs may be loaded and/or installed onto device 700 via ROM 702 and/or communication unit 709. One or more actions of method 200, method 300, method 600, and the like for processing a target object described above can be executed when the computer programs are loaded to RAM 703 and executed by CPU 701.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:
   acquiring an initial non-video feature vector on the basis of at least one input of a received speech input and text input;
   taking, in response to not receiving a video input, a default feature vector as an initial video feature vector in place of the video input;
   generating a video feature, a speech feature, and a text feature on the basis of the initial non-video feature vector and the initial video feature vector; and
   generating a processing parameter for a target object on the basis of the video feature, the speech feature, and the text feature, wherein the processing parameter includes at least one of an emotion parameter, an attribute parameter, and a pose parameter;
   wherein generating the processing parameter for the target object comprises generating the processing parameter utilizing a trained parameter generator model; and
   wherein the parameter generator model is trained over a plurality of iterations of an iterative training process in which the parameter generator model is adjusted based on distances between at least portions of respective distinct training parameter sets obtained in respective different ones of the iterations of the iterative training process.

2. The method according to claim 1, wherein the initial non-video feature vector comprises at least one of an initial speech feature vector and an initial text feature vector corresponding to the at least one input.

3. The method according to claim 2, wherein the default feature vector comprises an all-zero vector, and the taking a default feature vector as an initial video feature vector in place of the video input comprises:
   acquiring the all-zero vector as the initial video feature vector in response to not receiving the video input within a predetermined time period.

4. The method according to claim 2, further comprising:
   setting the initial text feature vector corresponding to the text input to be an all-zero vector in response to only receiving the speech input.

5. The method according to claim 2, further comprising:
   setting the initial speech feature vector corresponding to the speech input to be an all-zero vector in response to only receiving the text input.

6. The method according to claim 2, wherein the generating the video feature, the speech feature, and the text feature on the basis of the initial video feature vector and the initial non-video feature vector comprises:

generating an indication of a correlation among the initial video feature vector, the initial speech feature vector, and the initial text feature vector; and generating the video feature, the speech feature, and the text feature on the basis of the indication of the correlation.

7. The method according to claim 6, wherein the indication of the correlation comprises a synthetic tensor, and the generating the video feature, the speech feature, and the text feature on the basis of the indication of the correlation comprises:

decomposing the synthetic tensor to generate the video feature, the speech feature, and the text feature for the target object.

8. The method according to claim 6, wherein the indication of the correlation represents the correlation among the initial video feature vector, the initial speech feature vector, and the initial text feature vector.

9. The method according to claim 1, wherein the parameter generator model is trained at least in part by:

in a first round of iteration, respectively inputting each of a sample video input, a sample speech input, and a sample text input and/or any combination of the sample video input, the sample speech input, and the sample text input into the parameter generator model to obtain a corresponding first training parameter set;

in a second round of iteration, respectively inputting each of the sample video input, the sample speech input, and the sample text input and/or any combination of the sample video input, the sample speech input, and the sample text input into the parameter generator model to obtain a corresponding second training parameter set;

determining a distance between the first training parameter set and the second training parameter set; and adjusting the parameter generator model on the basis of the determined distance to obtain the trained parameter generator model.

10. The method according to claim 1, further comprising:
generating random noise; and
adding the random noise to an image to be processed that comprises the target object, so as to add a watermark to the image to be processed.

11. The method according to claim 1, further comprising:
rendering the target object according to the processing parameter;
generating a video that comprises the rendered target object; and
outputting the generated video.

12. An electronic device, comprising:
at least one processor; and
a memory coupled to the at least one processor and having instructions stored thereon, wherein the instructions, when executed by the at least one processor, cause the electronic device to perform actions comprising:
acquiring an initial non-video feature vector on the basis of at least one input of a received speech input and text input;
taking, in response to not receiving a video input, a default feature vector as an initial video feature vector in place of the video input;
generating a video feature, a speech feature, and a text feature on the basis of the initial non-video feature vector and the initial video feature vector; and
generating a processing parameter for a target object on the basis of the video feature, the speech feature, and the text feature, wherein the processing parameter includes at least one of an emotion parameter, an attribute parameter, and a pose parameter;

wherein generating the processing parameter for the target object comprises generating the processing parameter utilizing a trained parameter generator model; and wherein the parameter generator model is trained over a plurality of iterations of an iterative training process in which the parameter generator model is adjusted based on distances between at least portions of respective distinct training parameter sets obtained in respective different ones of the iterations of the iterative training process.

13. The electronic device according to claim 12, wherein the initial non-video feature vector comprises at least one of an initial speech feature vector and an initial text feature vector corresponding to the at least one input.

14. The electronic device according to claim 13, wherein the default feature vector comprises an all-zero vector, and the taking a default feature vector as an initial video feature vector in place of the video input comprises:

acquiring the all-zero vector as the initial video feature vector in response to not receiving the video input within a predetermined time period.

15. The electronic device according to claim 13, wherein the actions further comprise:

setting the initial text feature vector corresponding to the text input to be an all-zero vector in response to only receiving the speech input.

16. The electronic device according to claim 13, wherein the actions further comprise:

setting the initial speech feature vector corresponding to the speech input to be an all-zero vector in response to only receiving the text input.

17. The electronic device according to claim 13, wherein the generating the video feature, the speech feature, and the text feature on the basis of the initial video feature vector and the initial non-video feature vector comprises:

generating an indication of a correlation among the initial video feature vector, the initial speech feature vector, and the initial text feature vector, wherein the indication of the correlation comprises a synthetic tensor; and decomposing the synthetic tensor to generate the video feature, the speech feature, and the text feature for the target object.

18. The electronic device according to claim 12, wherein the parameter generator model is trained at least in part by:

in a first round of iteration, respectively inputting each of a sample video input, a sample speech input, and a sample text input and/or any combination of the sample video input, the sample speech input, and the sample text input into the parameter generator model to obtain a corresponding first training parameter set;

in a second round of iteration, respectively inputting each of the sample video input, the sample speech input, and the sample text input and/or any combination of the sample video input, the sample speech input, and the sample text input into the parameter generator model to obtain a corresponding second training parameter set;

determining a distance between the first training parameter set and the second training parameter set; and adjusting the parameter generator model on the basis of the determined distance to obtain the trained parameter generator model.

19. The electronic device according to claim 12, wherein the actions further comprise:
generating random noise; and adding the random noise to an image to be processed that comprises the target object, so as to add a watermark to the image to be processed.

20. A computer program product that is tangibly stored on a non-transitory computer-readable medium and comprises machine-executable instructions, wherein the machine-executable instructions, when executed by a machine, cause the machine to perform actions comprising:

acquiring an initial non-video feature vector on the basis of at least one input of a received speech input and text input;

taking, in response to not receiving a video input, a default feature vector as an initial video feature vector in place of the video input;

generating a video feature, a speech feature, and a text feature on the basis of the initial non-video feature vector and the initial video feature vector; and generating a processing parameter for a target object on the basis of the video feature, the speech feature, and the text feature, wherein the processing parameter includes at least one of an emotion parameter, an attribute parameter, and a pose parameter;

wherein generating the processing parameter for the target object comprises generating the processing parameter utilizing a trained parameter generator model; and wherein the parameter generator model is trained over a plurality of iterations of an iterative training process in which the parameter generator model is adjusted based on distances between at least portions of respective distinct training parameter sets obtained in respective different ones of the iterations of the iterative training process.

\* \* \* \* \*